March 20, 1934. G. S. FOSTER 1,951,826
ELECTRIC MINCER
Filed May 31, 1930

INVENTOR
G. S. Foster
BY
Siggers & Adams
ATTORNEYS

Patented Mar. 20, 1934

1,951,826

UNITED STATES PATENT OFFICE 1,951,826

ELECTRIC MINCER

George Stephen Foster, Wandsworth, England

Application May 31, 1930, Serial No. 458,451
In Great Britain June 4, 1929

4 Claims. (Cl. 146—182)

This invention refers to an improved electric mincer for preparing sausage-meats and the like, and it has for its primary object to provide a mincing machine for meat and other materials which, in addition to being more efficient and economical than heretofore, will be entirely safe or foolproof in operation.

To this end the machine is provided with an improved form of finger-guard or tray which, when in place, will effectively prevent the user's fingers from being caught in the mechanism and which, when removed for any purpose, will ensure the breaking of the electrical connection to the driving motor and the consequent stoppage of same until such time as the tray is replaced.

Now according to the present invention there is provided an electrically driven mincing machine for preparing sausage-meats and the like having associated with the feed hopper of the mincer a guard member for the cutting knives, which also serves to control the electric circuit of the motor so that the motor can only be started or run whilst the guard is in position.

In order that the present invention may be clearly understood and readily carried into effect, it is hereinafter described with reference to the accompanying drawing, in which:—

Figure 1:
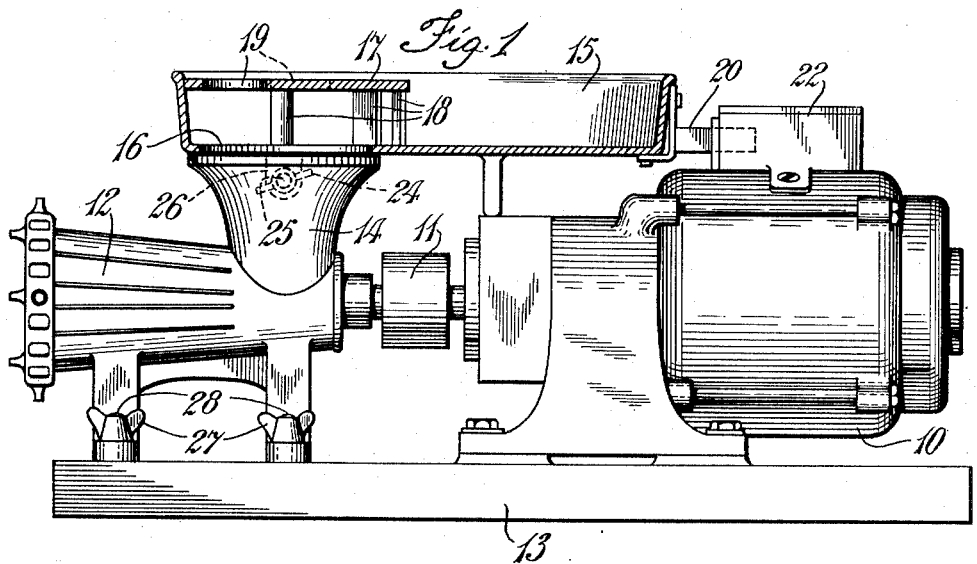
Figure 2:
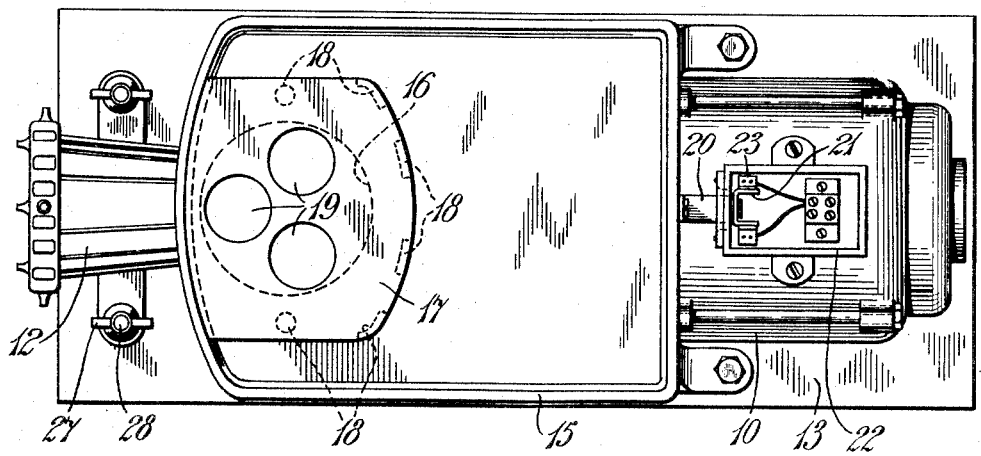

Figure 1 is a sectional side elevation of the improved electric mincing machine; and Figure 2 is a plan view thereof with the cover of the contact box removed.

As shown and in carrying the invention into practical effect, an electric motor 10 is connected by means of a loose coupling 11 to a meat-mincing machine 12 mounted upon a common heavy base 13 preferably of cast iron. This loose coupling makes it possible for the mincer 12 when taken off the base 13 for cleaning, to be replaced by a person not having any mechanical knowledge and without any loss of time in effecting the alignment of the mincer with the motor.

Attached to the hopper 14 of the mincer 12 and resting upon same, is a tray 15 having an inlet 16 leading to the hopper of the mincer. This inlet 16, in order to prevent fingers or hand being inserted into the mincer, is covered by a perforated guard 17 which is permanently fixed to the tray 15 so as to overlap the inlet 16 by a convenient distance, say about two inches all around, and spaced therefrom for a distance of about two and a half inches by means of hand checks or legs 18. The said hand checks or legs 18 are spaced apart for a distance of about two and a quarter inches, which arrangement effectively prevents the fingers from entering the hopper 14 but does not prevent the rapid and free feeding of the machine. The three holes 19 provided in the top of the guard (which may conveniently be of about two inches in diameter), are spaced and arranged so as to enable a plunger to be used from any angle when feeding the meat into the machine.

In order to ensure that the tray 15 and guard 17 are always in position over the hopper 14 of the mincer 12 when the motor is running, means are provided whereby whenever the guarded tray 15 is removed for any purpose, the electric circuit of the motor will be broken, so that the motor will automatically stop and then cannot under any circumstances be re-started until the tray 15 is replaced. To this end the tray 15 is provided at its end with an electrically insulated projection or bracket 20 which carries at its end a contact-making member 21 which is adapted to enter a sealed ironclad box 22 which contains the terminals and cut-out contact blocks 23 of the motor 10 and to bridge the contact blocks 23 to complete the circuit when the tray is in position. The tray is adapted to be locked in its operative position by means of a pair of wing nuts 24 on bolts 25 which co-operate with depending lugs 26 on the tray, the bolts 25 projecting from the side walls of the hopper 14. The mincer is likewise adapted to be removably held in place in the base 13 by wing nuts 27 and bolts 28, as shown.

When the tray is to be removed, the wing nuts 24 are loosened and the tray is first lifted slightly, to be disengaged from bolts 25, and then is pulled to the left as viewed in Fig. 1, so as to pull contact member 21 out of the box 22. When replacing the tray, contact member 21 is first inserted in the opening in the side of box 22 and then the tray is laid on hopper 14 and secured by nuts 24.

A further advantageous feature of the improved guard and tray is that it allows of a flow of air about the hopper or neck of the machine and so ensures efficient cooling which thereby prevents the overheating and souring of the chopped meat.

It will be manifest from the foregoing description that the improved machine is absolutely foolproof, inasmuch as the person operating the machine is effectively protected from contact with the revolving knives of the machine and cannot reach them even with his fingers, until the motor has stopped and the knives are at rest.

Further, the motor cannot be started until the hopper of the machine is properly guarded by the tray and guard and will be automatically stopped as soon as it is removed.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. An electrically driven mincing machine comprising, in combination, a base; a motor; a mincing device secured to the base and driven by the motor, said mincing device having a hopper open at the top for receiving the products to be minced; a removable tray having an opening in its bottom and rigidly secured on top of the hopper with said opening over the opening of the hopper; a perforated guard removably fixed to the tray and covering and shielding said tray opening but spaced above the same; means to secure the tray to the hopper; said tray extending across the space between the mincing device and the motor; an insulated, rigid projection on the motor end of the tray having a contact member at its end; a terminal box secured on top of the motor and having spaced contact members in the motor circuit; the contact member on the tray being so shaped as to bridge the spaced contact members in the box and thus complete the motor circuit but only when the tray is in hopper-guarding position.

2. An electrically driven mincing machine comprising, in combination, a mincing machine; a motor driving the same; said mincing machine having a hopper open at the top; a guard member removably secured to the hopper to prevent the entrance of fingers therein; said guard member having an insulated projection at one end; a terminal box secured on top of the motor and having spaced contact members in the motor circuit; and a contact member on the end of said insulated projection adapted to bridge the space between the contact members in the box and thus complete the motor circuit, but only when the guard is in hopper-shielding position; said guard being slidable over the top of the hopper; said box having an opening in one end for slidably receiving said projection, the projection completely closing said opening when its contact member is in circuit-closing position.

3. An electrically driven mincing machine comprising, in combination, a base; a motor secured to the base; a mincing device secured to the base and driven by the motor, said mincing device having a hopper open at the top for receiving the products to be minced; a tray having an opening in its bottom and removably fastened at one end over the hopper; a perforated guard immovably fixed to the tray and shielding said opening but spaced above the same; a terminal box on top of the motor having spaced contact members in the motor circuit and an orifice; said tray extending across the space between the mincing member and the motor and having a projection member to fit said orifice, thereby to lock the tray in position and to effect closing of the motor circuit when and only when the tray is in hopper-guarding position; the motor circuit thereby being broken, so that the mincer cannot be operated, whenever the tray is removed.

4. A mincing machine comprising, in combination, a base; a motor; a mincing device on the base and driven by the motor; said mincing device having a hopper open at the top for receiving the products to be minced; a removable tray slidable over the top of the hopper and having an opening in its bottom adapted to register with the opening of the hopper; a guard removably fixed to the tray and shielding said hopper opening but spaced above the same; means to secure the tray to the hopper; said motor having a circuit including a pair of spaced contact members; and the tray having a rigid projection which, when the tray is slid over the hopper into final position, moves between the contact members to close the motor circuit.

GEORGE STEPHEN FOSTER.